United States Patent
Wei et al.

(10) Patent No.: US 10,548,174 B2
(45) Date of Patent: Jan. 28, 2020

(54) TELECOMMUNICATIONS APPARATUSES AND METHODS

(71) Applicant: SONY CORPORATION, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/753,075

(22) PCT Filed: Sep. 21, 2016

(86) PCT No.: PCT/EP2016/072452
§ 371 (c)(1),
(2) Date: Feb. 15, 2018

(87) PCT Pub. No.: WO2017/055157
PCT Pub. Date: Apr. 6, 2017

(65) Prior Publication Data
US 2018/0242381 A1 Aug. 23, 2018

(30) Foreign Application Priority Data

Oct. 1, 2015 (EP) .................................... 15188002

(51) Int. Cl.
*H04W 76/14* (2018.01)
*H04W 8/00* (2009.01)
(Continued)

(52) U.S. Cl.
CPC .......... *H04W 76/14* (2018.02); *H04W 8/005* (2013.01); *H04W 40/22* (2013.01); *H04W 88/04* (2013.01)

(58) Field of Classification Search
None
See application file for complete search history.

(56) References Cited

U.S. PATENT DOCUMENTS

| 9,392,433 B2 * | 7/2016 | Li ........................ H04W 8/005 |
| 2014/0044036 A1 * | 2/2014 | Kim .................. H04W 72/0446 370/315 |

(Continued)

FOREIGN PATENT DOCUMENTS

| EP | 2 806 673 A1 | 11/2014 |
| WO | WO 2012/125499 A1 | 9/2012 |
| WO | WO 2015/119538 A1 | 8/2015 |

OTHER PUBLICATIONS

International Search Report dated Dec. 21, 2016 in PCT/EP2016/072452 filed Sep. 21, 2016.

(Continued)

*Primary Examiner* — Eunsook Choi
(74) *Attorney, Agent, or Firm* — Xsensus, LLP

(57) ABSTRACT

A method of relaying a terminal-to-terminal communication in a mobile telecommunication system, the mobile communication system including a first mobile terminal, a second mobile terminal, and a mobile node configured to operate as a terminal-to-terminal relay node, the method including: measuring a first link quality between the first mobile terminal and the second mobile terminal wherein the first mobile terminal and the second mobile terminal are establishing, or are in an established, device-to-device communication; identifying, based on at least the measured first link quality, that the mobile node is a suitable candidate for operating as a terminal-to-terminal relay node for the device-to-device communication; and the mobile node operating as a terminal-to-terminal relay node for assisting the device-to-device communication.

20 Claims, 7 Drawing Sheets

(51) Int. Cl.
*H04W 40/22* (2009.01)
*H04W 88/04* (2009.01)

(56) References Cited

U.S. PATENT DOCUMENTS

| | | |
|---|---|---|
| 2014/0321367 A1 | 10/2014 | Marupaduga et al. |
| 2014/0328310 A1 | 11/2014 | Xu |
| 2014/0329535 A1 | 11/2014 | Sadiq et al. |
| 2015/0045033 A1* | 2/2015 | Kim ................... H04B 7/15507 455/436 |
| 2015/0117299 A1* | 4/2015 | Zhang ................. H04L 25/0256 370/315 |
| 2016/0345307 A1* | 11/2016 | Huang ............... H04W 52/0216 |
| 2016/0360464 A1* | 12/2016 | Han ...................... H04W 36/24 |
| 2017/0244468 A1* | 8/2017 | Zhao ..................... H04W 36/06 |
| 2018/0092022 A1* | 3/2018 | Huang ................. H04W 40/22 |
| 2018/0139682 A1* | 5/2018 | Xu ........................ H04W 88/04 |
| 2018/0242340 A1* | 8/2018 | Pu ..................... H04W 52/0274 |

OTHER PUBLICATIONS

Harri Holma, et al., "LTE for UMTS OFDMA and SC-FDMA Based Radio Access" John Wiley and Sons, 2009, 4 Pages.

* cited by examiner

TELECOMMUNICATIONS APPARATUSES AND METHODS

CROSS-REFERENCE TO RELATED APPLICATIONS

The present application is based on PCT filing PCT/EP2016/072452 filed Sep. 21, 2016, and claims priority to European Patent Application 15 188 002.8, filed in the European Patent Office on 1 Oct. 2015, the entire contents of each of which being incorporated herein by reference.

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

In parallel, the development of relay nodes in telecommunications system is expected to facilitate communications with the base stations and potentially to expand the range of coverage of the base stations by relaying communications between terminal devices and base stations. However, due to the complexity of D2D arrangements and in particular to the lack of centralised control points (like the base stations in a conventional mobile network), there is at present a lack of relaying solutions for D2D communications.

SUMMARY

According to a first example aspect, there is provided a method of relaying a terminal-to-terminal communication in a mobile telecommunication system, the mobile communication system comprising a first mobile terminal, a second mobile terminal and a mobile node configured to operate as a terminal-to-terminal relay node. The method comprises measuring a first link quality between the first mobile terminal and the second mobile terminal wherein the first mobile terminal and the second mobile terminal are establishing a, or are in an established, device-to-device communication; identifying, based on at least the measured first link quality, that the mobile node is a suitable candidate for operating as a terminal-to-terminal relay node for the device-to-device communication; and the mobile node operating as a terminal-to-terminal relay node for assisting the device-to-device communication. It is noteworthy that any of these method steps and of the possible further configurations discussed in the claims and clauses herein may be carried out by any one or more of a mobile terminal, a mobile node and/or a base station if appropriate. Also, the discussions and teachings in respect of the first example aspect apply equally to any other example aspect, e.g. to any one or more of the second to the twelfth example aspects discussed below.

According to a second example aspect, there is provided a method of operating a first mobile terminal in a mobile telecommunication system, the mobile communication system comprising the first mobile terminal, a second mobile terminal and a mobile node configured to operate as a terminal-to-terminal relay node, the method comprising the first mobile terminal measuring a first link quality between the first mobile terminal and the second terminal wherein the first mobile terminal and the second mobile terminal are establishing a, or are in an established, device-to-device communication; identifying, based on at least the measured first link quality, that the mobile node is a suitable candidate for operating as a terminal-to-terminal relay node for the device-to-device communication; and communicating with the second mobile terminal using the mobile node as a terminal-to-terminal relay.

According to a third example aspect, there is provided a mobile terminal for use in a mobile telecommunication system, the mobile communication system comprising the mobile terminal, a second mobile terminal and a mobile node configured to operate as a terminal-to-terminal relay node, the mobile terminal being configured to: measure a first link quality between the mobile terminal and the second terminal wherein the mobile terminal and the second mobile terminal are establishing a, or are in an established, device-to-device communication; identify, based on at least the measured first link quality, that the mobile node is a suitable candidate for operating as a terminal-to-terminal relay node for the device-to-device communication; and communicate with the second mobile terminal using the mobile node as a terminal-to-terminal relay.

According to a fourth example aspect, there is provided circuitry for a mobile terminal for use in a mobile telecommunications system comprising the mobile terminal, a second mobile terminal and a mobile node configured to operate as a terminal-to-terminal relay node, wherein the circuitry comprises a controller element and a transceiver element configured to operate together to: measure a first link quality between the mobile terminal and the second terminal wherein the mobile terminal and the second mobile terminal are establishing a, or are in an established, device-to-device communication; identify, based on at least the measured first link quality, that the mobile node is a suitable candidate for operating as a terminal-to-terminal relay node for the device-to-device communication; and communicate with the second mobile terminal using the mobile node as a terminal-to-terminal relay.

According to a fifth example aspect, there is provided a method of operating a mobile node for relaying a terminal-to-terminal communication in a mobile telecommunication system, the mobile communication system comprising a first mobile terminal, a second mobile terminal and the mobile node, the mobile node being operable as a terminal-to-terminal relay node, wherein the method comprises the mobile node: based on at least a measured first link quality, the first link quality being measured between the first mobile terminal and the second terminal wherein the first mobile terminal and the second mobile terminal are establishing a, or are in an established, device-to-device communication, identifying that the mobile node is a suitable candidate for operating as a terminal-to-terminal relay node for the device-to-device communication; and operating as a terminal-to-terminal relay node for assisting the device-to-device communication.

According to a sixth example aspect, there is provided a mobile node for relaying a terminal-to-terminal communication in a mobile telecommunication system, the mobile communication system comprising a first mobile terminal, a second mobile terminal and the mobile node, the mobile node being operable as a terminal-to-terminal relay node and being configured to: based on at least a measured first link quality, the first link quality being measured between the first mobile terminal and the second terminal wherein the first mobile terminal and the second mobile terminal are establishing a, or are in an established, device-to-device communication, identify that the mobile node is a suitable candidate for operating as a terminal-to-terminal relay node for the device-to-device communication; and operate as a terminal-to-terminal relay node for assisting the device-to-device communication.

According to a seventh example aspect, there is provided circuitry for a mobile node for relaying a terminal-to-terminal communication in a mobile telecommunication system, the mobile communication system comprising a first mobile terminal, a second mobile terminal and the mobile node, wherein the circuitry comprises a controller element and a transceiver element configured to operate together to: based on at least a measured first link quality, the first link quality being measured between the first mobile terminal and the second terminal wherein the first mobile terminal and the second mobile terminal are establishing a, or are in an established, device-to-device communication, identify that the mobile node is a suitable candidate for operating as a terminal-to-terminal relay node for the device-to-device communication; and operate as a terminal-to-terminal relay node for assisting the device-to-device communication.

According to an eighth example aspect, there is provided a method of operating a base station for relaying a terminal-to-terminal communication in a mobile telecommunication system, the mobile communication system comprising a first mobile terminal, a second mobile terminal and a mobile node configured to operate as a terminal-to-terminal relay node, the method comprising the base station: receiving a measurement report relating to a first link quality between the first mobile terminal and the second terminal wherein the first mobile terminal and the second mobile terminal are establishing a, or are in an established, device-to-device communication; identifying, based on at least the measured first link quality, that the mobile node is a suitable candidate for operating as a terminal-to-terminal relay node for the device-to-device communication; and instructing the mobile node and at least one of the first and second mobile terminals to use the mobile node as a terminal-to-terminal relay node for assisting the device-to-device communication.

According to a ninth example aspect, there is provided a base station for relaying a terminal-to-terminal communication in a mobile telecommunication system, the mobile communication system comprising a first mobile terminal, a second mobile terminal and a mobile node configured to operate as a terminal-to-terminal relay node, the station being configured to: receive a measurement report relating to a first link quality between the first mobile terminal and the second terminal wherein the first mobile terminal and the second mobile terminal are establishing a, or are in an established, device-to-device communication; identify, based on at least the measured first link quality, that the mobile node is a suitable candidate for operating as a terminal-to-terminal relay node for the device-to-device communication; and instruct the mobile node and at least one of the first and second mobile terminals to use the mobile node as a terminal-to-terminal relay node for assisting the device-to-device communication.

According to a tenth example aspect, there is provided circuitry for a base station for relaying a terminal-to-terminal communication in a mobile telecommunication system, the mobile communication system comprising a first mobile terminal, a second mobile terminal and a mobile node configured to operate as a terminal-to-terminal relay node, wherein the circuitry comprises a controller element and a transceiver element configured to operate together to: receive a measurement report relating to a first link quality between the first mobile terminal and the second terminal wherein the first mobile terminal and the second mobile terminal are establishing a, or are in an established, deviceto-device communication; identify, based on at least the measured first link quality, that the mobile node is a suitable candidate for operating as a terminal-to-terminal relay node for the device-to-device communication; and instruct the mobile node and at least one of the first and second mobile terminals to use the mobile node as a terminal-to-terminal relay node for assisting the device-to-device communication.

According to an eleventh and twelfth example aspect, there is provided computer software which, when executed by a computer, causes the computer to perform any of the above methods and a storage medium which stores the computer software, respectively.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
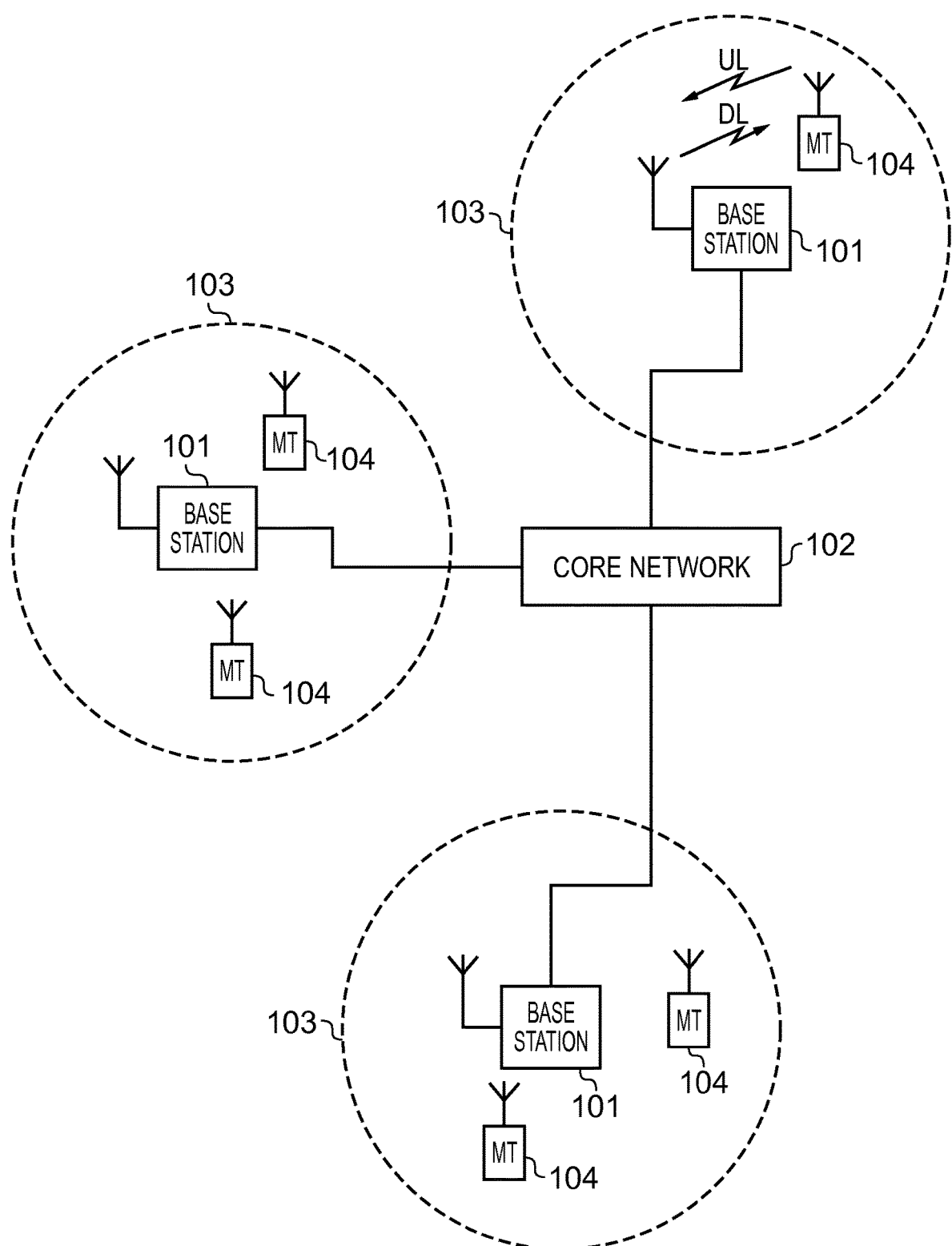
FIG. 1 provides a schematic diagram illustrating an example of a mobile telecommunication system.

FIG. 1 provides a schematic diagram illustrating some basic functionality of a mobile (cellular) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system 100 may further comprise one or more base station-to-terminal relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, mobile terminal, mobile device and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
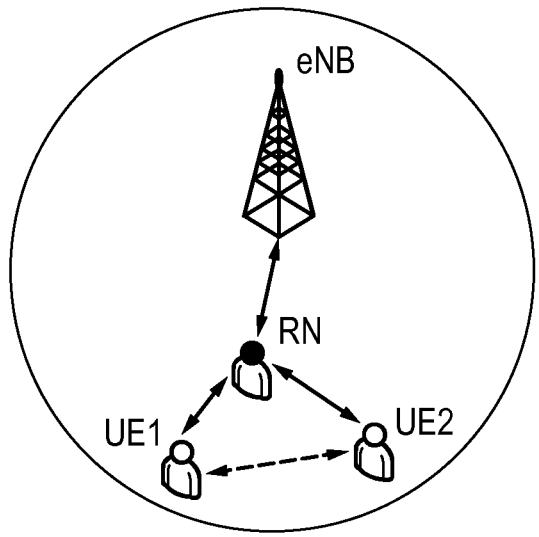
FIGS. 2-5 schematically represent examples of terminal-to-terminal relay assistance.

FIGS. 2-5 schematically represent examples of terminal-to-terminal relay assistance. In the example of FIG. 2, the mobile node operating as a relay (that will sometimes be referred to as Relay Node or "RN") and the two terminals UE1 and UE2 are all within coverage of the base station (eNB), with the terminals being located at the edge of the cell. In a conventional arrangement, if UE1 and UE2 are under coverage of a base station and wish to set up a D2D communication, they have to request resources from the base station and wait for the base station's allocation before they can fully establish the D2D communication. If one of UE1 or UE2 receives a grant, sometimes referred to as an uplink grant, from the base station that indicates the resources allocation, conventionally it will announce the allocated resources in a broadcast scheduling assignment. Once the other one of UE1 and UE2 gets this resource allocation information, they can both start the D2D communication on these specific resources. In cases where the link between UE1 and/or UE2 and the base station is of poor quality (e.g. with a weak power and/or interferences from other signals), the uplink grant (for both the sending of the scheduling assignment and for the D2D communication data) may not always be received from the base station and any future control signalling from the base station may also suffer from the same problem. In a case where another terminal, or any other type of mobile mode or device, is located between the base station and the cell edge terminals, this terminal could operate as a RN, as illustrated in FIG. 2, for assisting one of or both of the establishment of the D2D link and any subsequent D2D data communication. For example, if the RN mobile node is to operate as a terminal-to-terminal relay node, the base station may sent a grant for resources for UE1-RN communications and another one for UE2-RN operations and then the RN can assist with the setting up and with the carrying out of the terminal-to-terminal communications between UE1 and UE2. Also, by using a relay between UE1 and UE2, whether at the edge of the cell or not, the transmission power used by these UEs can be reduced thereby assisting with reducing power consumption and interferences.

Figure 3:
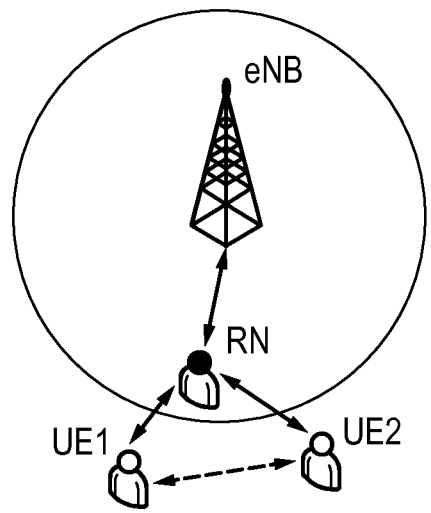
Figure 4:
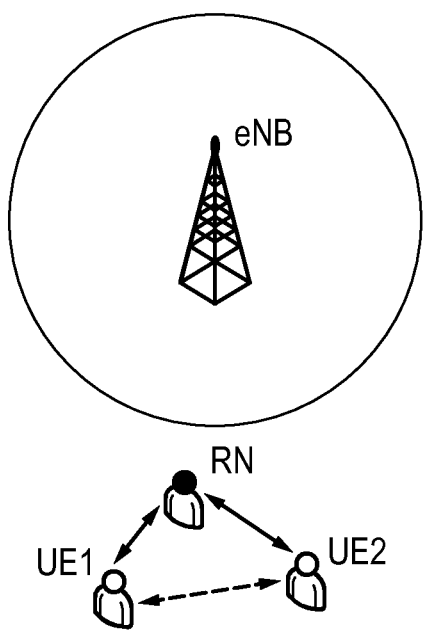
Figure 5:
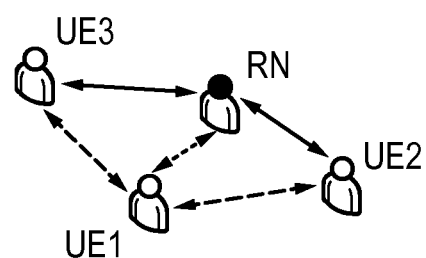

In another example, illustrated in FIGS. 3 and 4, the terminals UE1 and UE2 are out of coverage of the base station. In the example of FIG. 3, UE1 and UE2 are located outside the cell for the base station with the RN being located within the cell while UE1 and UE2 are located inside the cell for the base station with the RN being located outside the range of the base station (such that the presence or absence of a base station has no relevance). In a conventional D2D system, if UE1 and UE2 decide to establish a D2D communication, one of the two terminals can select resources from a resource pool to transmit messages comprising control and/or data information. The resource pool can be pre-configured, and/or semi-statically allocated. While some resource collision with other D2D communications in the proximity of the two terminals may occur with this type of an autonomous selection scheme, this is outside the scope of the present disclosure. If another terminal (or another mobile node) is located within range of both these terminals, the assistance of such a mobile node as a terminal-to-terminal relay node could help the D2D communications between the two terminals. Also, in some examples, such a RN could also act as a central controller for the allocation of D2D resource from a D2D resource pool. As a result, the quality of D2D communication link between UE1 and UE2 can be improved using the relay node, and potentially the quality of other D2D communications in the area can also be improved if the level of resources collision and/or interferences can be reduced.

In yet another example illustrated in FIG. 4, the terminals UE1-UE3 and the mobile node RN are located in the same area. None, some or all of these four mobile nodes may be within the range of a base station (whether on the edge of the cell or not) or may be out of coverage.

UE2 and UE3, which are relatively distant from each other may have some difficulty establishing or maintaining a D2D link. One of the possible options for improving the situation is to increase the transmission power of the terminals so that their respective transmissions can reach the other terminal more easily. However, this option will increase the power consumption of the UE and may also cause (or increase the effect of) interferences to other communications in the area. On the other hand, if at least one mobile node is situated in-between UE2 and UE3 (e.g. RN and UE1 in FIG. 5) and could assist these terminals with their D2D communication, the effect of some of the above disadvantages can be reduced. For example, if at least one terminal (e.g. RN, UE1) situated in between the two D2D terminals (e.g. UE2, UE3) could work as a relay for these two D2D terminals or assign another terminal (e.g. UE1, RN) as the terminal-to-terminal relay for these two D2D UEs, the D2D communications could be improved. In one example, and referring back to FIG. 5, RN may be operating as a relay for D2D communications between UE2 and UE3, either by default or by selection, and this mobile node may also be configured to assign the relay function to UE1 so that UE1 becomes the terminal-to-terminal relay for D2D communications between UE1 and UE2. Additionally, such a terminal may also assist in managing the resource allocation for one or more D2D terminals in the area. Accordingly, using such a terminal-to-terminal relay may help in improving the overall network performance while limiting the negative effect on the energy efficiency and spectrum efficiency of the network.

Figure 6:
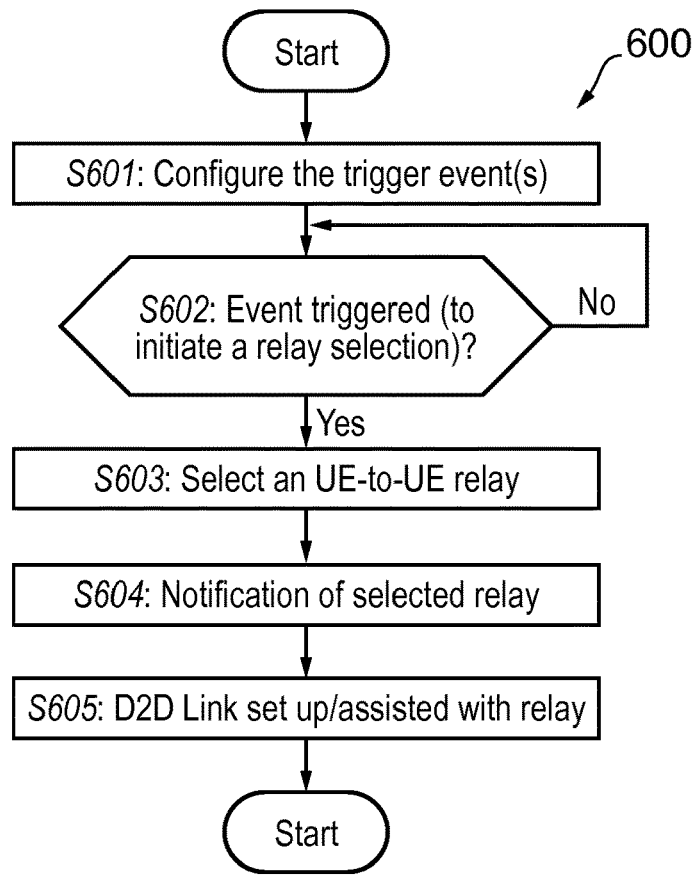
FIG. 6 provides an illustration of an example method for selecting a terminal-to-terminal relay.

According to an example of the present disclosure, there is provided a method for selecting a terminal-to-terminal relay for assisting with device-to-device communications. FIG. 6 provides an illustration of an example method for selecting a terminal-to-terminal relay. The method 600 starts and at S601, one or more trigger events are configured in one or more mobile nodes. In some examples, the trigger events can be configured or updated by the network, can be pre-configured in the mobile nodes and/or can be configured in any other suitable manner. For example, thresholds to be used with one or more events may be communicated by the network via a reportConfig Information Element (IE) from the base station to the terminal, with dedicated signalling. Then, at S602, it is determined or monitored whether at least one of these event(s) for initiating a terminal-to-terminal relay selection has been triggered at a mobile node. If such an event has not been triggered, then the mobile node continues monitoring the event(s). If however an event has been triggered, then the method moves on to S603 where a terminal-to-terminal relay is selected. It is noteworthy that while in some example S603 will be carried out by the same mobile node at S602, in other examples it may be carried out by a different mobile node. For example, the trigger event(s) monitoring may be carried out by a terminal while the relay selection may be carried out by a base station, another terminal, or any other mobile node. Once the relay node has been selected by a mobile node, the relevant parties are notified of the selected relay node (S604). If for example two terminals are in a D2D communication and a mobile node has been identified as the terminal-to-terminal relay for this D2D communication, each of these three parties has to be made aware of the mobile node going to act as a terminal-to-terminal relay. In a case where the mobile node has identified itself as the terminal-to-terminal relay, this can be notified to the two terminals, e.g. by the relay node, the network (e.g. base station), etc. In a case where a first of the terminals has identified the mobile node as the relay node, this can be notified to the other terminal and the mobile node, for example by the first terminal, by the network, etc.

Once all parties have been notified of the relay selection, the D2D communication between the relevant two terminals can be set up and/or carried out with the assistance of the relay node (S605).

In the following discussion, different aspects regarding how relaying can be set up for terminal-to-terminal relaying will discussed. It is intended that any possible combination of the teachings provided in this respect at within the scope of the present disclosure, so long as they are technically achievable and, as the skilled person will understand from the present disclosure, some combinations may be more suitable or beneficial than other depending on the situation and/or configuration at hand.

Figure 7:
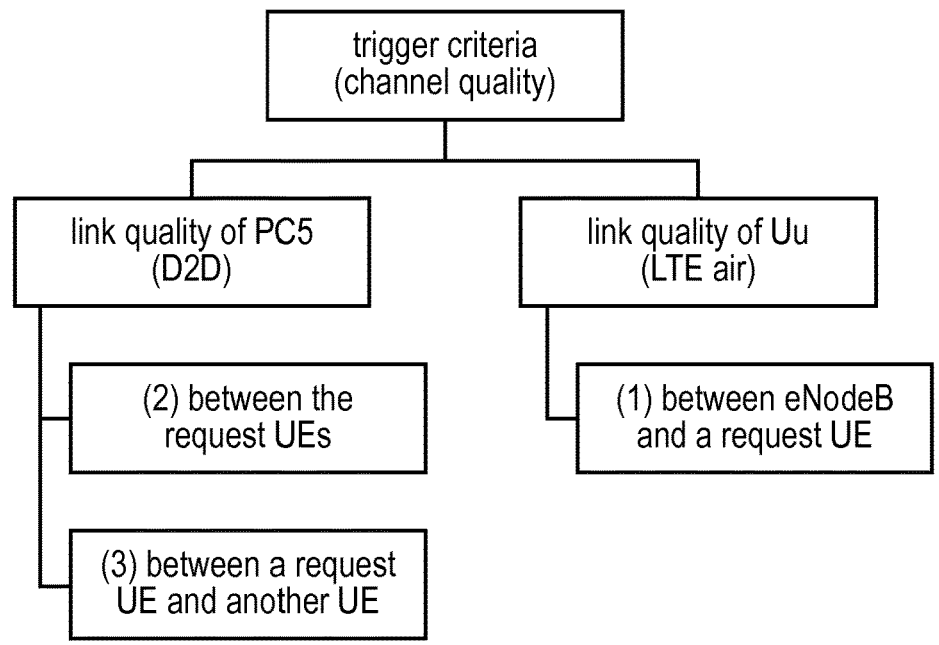
FIG. 7 schematically represents example types of trigger criteria.

FIG. 7 schematically represents different types of criteria that may be used for to trigger an event (or a measurement report if appropriate). In the example of FIG. 7, the example criteria are related to channel quality and in particular to channel quality for two links: the Uu link between a terminal and the base station and the PC5 link between two terminals. In the present disclosure, the term "request" UE or terminal will refer to a terminal that wishes to establish a D2D link or that has already established a D2D link with at least another (also "request") terminal. Although in some examples discussed below only two request UEs are considered (e.g. for a D2D unicast communication), in other examples three or more request UEs may be considered (e.g. for a D2D broadcast communication with two or more other terminals). The teachings provided in respect of one situation should be considered as applying for the other situation as well, so long as it is technically possible.

Example measurements in accordance with the present disclosure include, as illustrated in FIG. 7:

(1) Uu link quality, refer to as RSRP_Uu, which indicates the link quality between a request UE and network, the case where the request UE is within coverage of a base station (e.g. eNobdeB);
(2) PC5 link quality between the two request UEs, refer to as RSRP_ReqU_PC5; and
(3) PC5 link quality between a request UE with a neighbour UE, refer to as RSRP_NeighU_PC5

The measurement referred to as RSRP_ReqU_PC5 can assist in measuring the D2D link quality for the current (or potential) D2D communication between the request UEs. On the other hand, the RSRP_NeighU_PC5 measurement can be valuable in assisting the identification of potential UE-to-UE relay candidates. It is noteworthy that, in previous arrangements, measurements taken into consideration by mobile system included measurements regarding the Uu link (1) or the PC5 link between a UE and a neighbouring UE (3) but it is believed that the PC5 link between two request UEs (2) has not been previously considered. This type of measurement can be used in accordance with the present disclosure for the establishment of a terminal-to-terminal relay node arrangement.

For the first type (1) of measurement, a conventional RSRP or RSRQ measurement based on the Channel Reference Signal (CRS) or Channel State Information-Reference Signal (CSI-RS) can be adopted or any other suitable type of channel quality measurement may be adopted. For the second and third types (2) and (3) of measurement, a conventional RSRP or RSRQ measurement of the DeModulation Reference Signal (DMRS) on the Physical Sidelink Discovery or Shared CHannel (PSDCH or PSSCH), a RSRP-like or RSRQ-like measurement on a device-to-device discovery or shared channel, a RSRP measurement of sidelink synchronization signalling, or any other suitable and appropriate type of measurement can be used. It is noteworthy that even though the name of the measurement used herein includes "RSRP", this name is merely an example name and does not imply that the teachings provided herein are limited to RSRP or RSRP-like measurements.

The triggers for the relay selection (and the relay selection) can be based on any of these measurements. These triggers can be activated for example based on:
Measurement reports from one or more mobile nodes
One of the request terminals detecting that it should initiate a relay search
A neighbouring terminal detecting that it could assist by providing D2D relaying and
The network (e.g. a base station) detecting that D2D relaying would be preferable.

Figure 8:
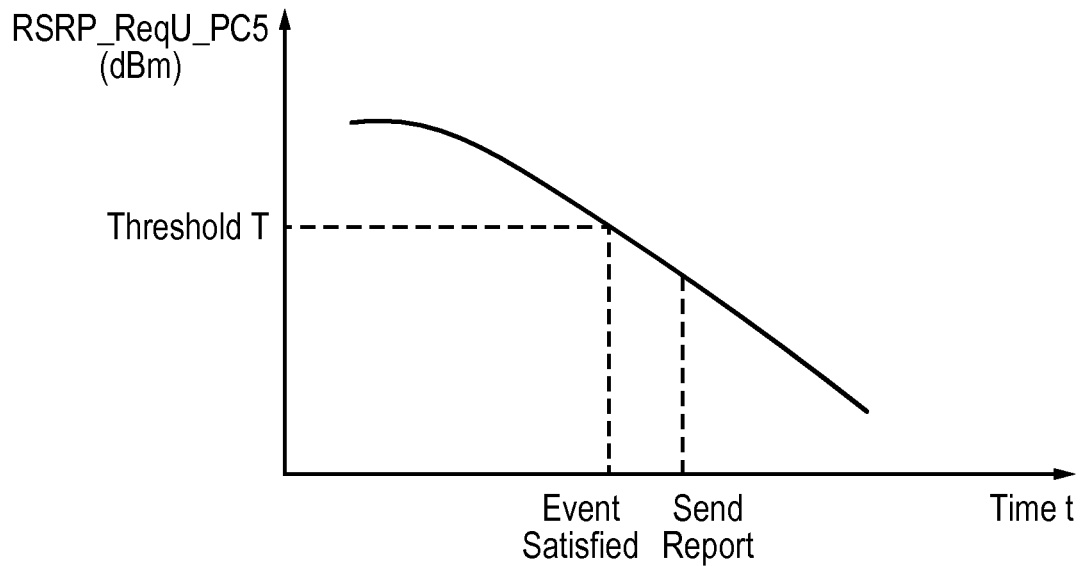
FIG. 8 represents an example of a measurement-based event.

An example of a triggering event (for "event1") is discussed below in respect of FIG. 8.

Event1: RSRP_ReqU_PC5 becomes worse than a threshold

While the RSRP_ReqU_PC5 is monitored, it is compared to a threshold "T" and if it falls below the threshold T, then this event is triggered. Other examples of events are provided below, although the skilled person will understand that more or fewer events may be used and that different events may be used as well. In the example of FIG. 8, the event triggers a measurement report, for example to a base station if the terminal is within coverage or to another mobile node (although in other examples no measurement reports may be sent, for example if the terminal decides on the relay node). There is generally a delay between the condition of an event being met and the transmission of a report, as illustrated in the example of FIG. 8.

Further trigger events are discussed below.

Event2: RSRP_NeighU_PC5 becomes better than a threshold

This event may indicate that a neighbouring terminal has a potentially very good link quality with one of the request terminals such that this terminal could potentially be a suitable relay node if the need for a relay later arises.

Event3: RSRP_NeighU_PC5 becomes better than RSRP_ReqU_PC5

Event4: RSRP_NeighU_PC5 becomes offset better than RSRP_ReqU_PC5

In these events, the link quality between the two request terminals can worse than the link with a neighbouring terminal, or become worse than this link even when an offset factor is considered. Again, this could potentially indicate that the neighbouring terminal may present itself as a potentially valuable relay node candidate for the communication between the request terminals as the measuring request terminal can already communicate better with this neighbour than with another request terminal.

Event5: RSRP_ReqU_PC5 becomes worse than threshold 5-1 and RSRP_NeighU_PC5 becomes better than threshold 5-2

In this example, the quality of the link between the request terminals falls below a certain pre-determined quality while, at the same time, the link quality between the request terminal and a neighbouring terminal is above a threshold. This combined loss of quality on the D2D link and high quality for a neighbouring link may indicate that the D2D link is suffering from a poor quality and that the neighbouring terminal may be able to assist with the communication on the D2D link.

Event6: RSRP_Uu becomes worse than threshold 6-1, and RSRP_ReqU_PC5 becomes worse than threshold 6-2, and RSRP_NeighU_PC5 becomes better than threshold 6-3.

In this case, the link between a request terminal and (i) another request terminal on one hand and (ii) the base station on the other hand are currently of low quality while the link with a neighbouring terminal is of relatively good quality. As a result, the D2D link may require assistance to continue to meet some quality requirements and the request terminals are unlikely to obtain a valuable assistance from the base station in view of the poor link between the request UE and the base station. At the same time, as the link with the neighbour UE is however relatively good, this neighbouring node may be a candidate for relaying the terminal-to-terminal communication between the two request terminals.

In a case where measurement reports are transmitted, a number of mobile nodes may be sending measurements reports based on Uu and/or PC5 links measurements. However, this could potentially result in a large number of reports being sent which could in turn potentially result in a waste of wireless and/or energy resources and a reduction of throughput available for data communications. Accordingly, the number of measurements may be reduced with a view to avoiding these possible side effects. For example one or more of the following scheme can be put in place. Firstly the number of UEs to be configured for measurement can be reduced. For example only the highly active D2D terminals and/or the potential candidate relays can be configured as terminals carrying out measurements and sending reports. In a second example (which may be combined with the first one), the number of measurement reports can be limited by limiting the number of measurement reports to be sent. For example, for a measurement report to be transmitted, only the best/worst ones may be sent and the other ones may not be transmitted. Taking event2 as an example, if a first terminal has ten neighbouring terminals and seven of them have better link quality than the threshold, then according to event2, a measurement report (regardless of it being sent as a single or multiple message) may have to includes each of the seven link quality measurements between the first terminal and the relevant seven neighbouring terminals above the threshold. In accordance with an example of the present disclosure, the number of reports may be limited by for example sending only the best n link quality measurements with the report. For example, if n=3, then only three measurements will be reported out of the original seven in this example—and if only one or two measurements trigger event2, then all of these can be reported. The number n could for example be pre-configured in the terminal or be configured by the network, for example in the reportConfig Information Element (IE) from the base station to the terminal.

Such scheme(s) to limit the amount of measurement may for example be configurable by the network, and/or configuration parameters may be transmitted or forwarded by neighbouring terminals, so that it can be dynamically adjusted to suit the current needs and use of the network, or may be pre-configured in a terminal Although examples event1-event6 have been provided above, other measurement triggers may also be used for triggering a measurement report transmission which can precede a relay selection, if any. In some examples, event2 can trigger a measurement report transmission but may not automatically trigger a relay selection to try to identify a suitable candidate for a relay node, while event1 can trigger both of the transmission of a measurement report and a relay selection. In some examples a relatively good link with a neighbour may trigger a measurement report to a base station and the base station can decide whether to use the neighbour as a relay based on this and any other measurement reports its receives (e.g. from another request UE).

Figure 9:
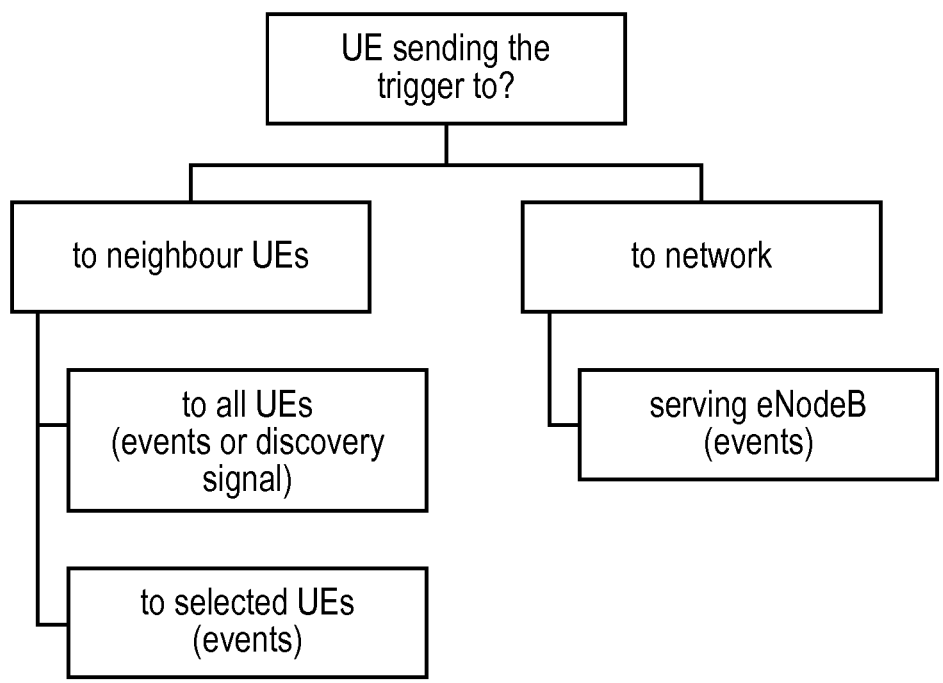
FIG. 9 represents an example of destinations for sending a relay request.

As the skilled person would have understood already, while the selection of a relay node may be triggered by a mobile node, the actual selection may then be carried out by the same mobile node or by another mobile node. For example, a UE making measurements may send measurement reports to others and/or select the relay itself and/or may send the trigger to another terminal. In some examples, a request terminal may, when the link with the other request UE is less than a threshold, trigger a relay selection which may for example result in the terminal attempting to discover a relay candidate, for example by requesting assistance for the relay selection from another mobile node. In the case where, based on the link quality measurements, the terminal decides that it should start a relay selection, it can send messages (hereinafter referred to as "triggers") to other mobile nodes. This is illustrated in FIG. 9 which represents to whom a terminal can send a trigger (e.g. following an event trigger as discussed in respect of S602).

In one example, the trigger is sent to neighbouring terminals. This can for example be broadcast to all neighbouring terminals via an event or discovery signal indicating that this is a search for a relay node or this can be sent to a selected or limited number of terminals. For example, the trigger or trigger notification may be sent only to terminals for which the RSRP_NeighU_PC5 measurement is above a threshold. The terminals receiving the trigger may then, if appropriate, participate in the relay selection. For example they may measure their link with the other request terminal and, if this link is sufficiently good, they can report this to the terminal that sent the trigger or may in some cases notify the terminals that it will operate as a relay.

In the case of a trigger that is being broadcast to all neighbours, the trigger which effectively serves as a relay request can indicate at least one of the target terminal (or source terminal) requiring relaying assistance, once or more other request terminals, a message size etc. as deemed appropriate. Such a request can be encapsulated in a MAC Packet Data Unit "PDU" (e.g. a D2D MAC PDU on the SideLink Shared CHannel "SL-SCH", or any suitable D2D transport other transport channel) with the above information in the MAC Service Data Unit "SDU". Alternatively or additionally, a MAC Control Element "MAC-CE" can used to be transmitted in MAC PDU on a SL-SCH, or any suitable D2D transport other transport channel. An example of such a MAC CE message is illustrated in table 1 below.

TABLE 1

|     |   |   | Target UE (group) ID |   |   |   |   | Oct 1 |
|-----|---|---|----------------------|---|---|---|---|-------|
|     |   |   | Target UE (group) ID |   |   |   |   | Oct 2 |
|     |   |   | Target UE (group) ID |   |   |   |   | Oct 3 |
|     |   |   | Buffer Size          |   |   |   |   | Oct 4 |
| B/U | R | R | R                    | R | R | R | R | Oct 5 |

Such a new MAC-CE message may use a pre-defined Logical Channel ID "LCID" which can be selected from an existing LCID for MAC-CE message with a suitable format or can be selected as a new LCID, thereby defining a new MAC-CE message. The message may include a field, indicated as "B/U" to indicate whether the relaying is for broadcast or unicast (see the discussion below in this respect). For information, "R" generally refers to "Reserved" but the example message structure provided herein are indicative and other fields or arrangements may be used to indicate whether the relaying is for broadcast or unicast or to indicate any of the target, source, relay, or destination, as appropriate. As an alternative to using a MAC PDU or additionally, the request UE could send a discovery message containing the above information which would then be broadcasted to all of its neighbours. The neighbours who receive such a request may then decide whether to respond or not.

Figure 10:
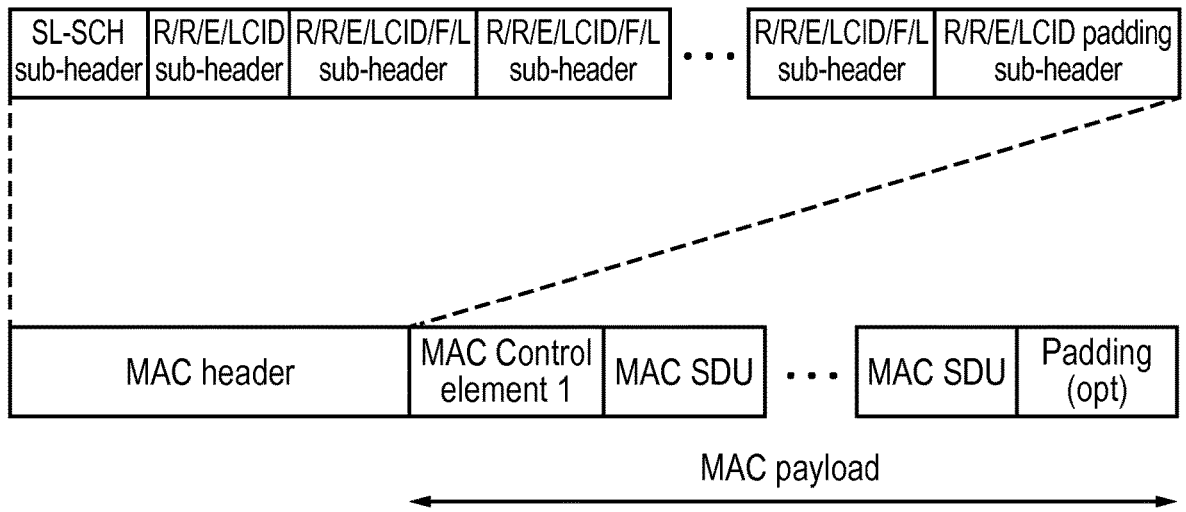
FIG. 10 represents an example of a MAC PDU.

In the case where a trigger is sent to a subset of all the neighbours, an example of a selection criterion is the PC5 link quality with the neighbours. The relay request may for example indicate at least one of the target terminal (or source terminal) requiring relaying assistance, once or more other request terminals, a message size etc. as deemed appropriate. The request can be encapsulated in a D2D MAC PDU (on the SL-SCH) with the above information in the MAC SDU. Alternatively or additionally, a MAC-CE can used to be transmitted in MAC PDU on a SL-SCH, or any suitable D2D transport other transport channel, for example as illustrated in table 1 above. The discussion of table 1 above applies equally to this section. Alternatively or additionally, the request UE could also send a restricted discovery message (e.g. which designates the desired receivers) containing the above information and then broadcast this restricted discovery message to its neighbours. In this case, a transparent MAC transmission may not be used and a MAC PDU on the SL-SCH—or any other suitable transport channel—can be adopted for such a restricted discovery message. An example of a possible MAC PDU is illustrated in FIG. 10. As for the other cases, the neighbours who receive such a request can decide whether to respond or not and whether to assist or not.

In another example, the trigger is sent to the network, such as to the serving base station if there is any, and the base station can assist with or carry out the relay selection. Such a trigger or relay request message can may for example indicate at least one of the target terminal (or source terminal) requiring relaying assistance, once or more other request terminals, a message size etc. as deemed appropriate. Dedicated signalling can be defined and/or the existing signalling can be reused, for example a current sidelink Buffer Status Report "BSR" MAC-CE message may be reused. Preferably the MAC-CE message may have a new LCID. The network may then nominate a relay node (e.g. a terminal), for example according to the measurement report, or may forward the request to candidate relays, for example to pre-selected mobile nodes based on measurements reports or on any other elements.

As for the measurement reports, it may be desirable in some cases to restrict the number of relay requests that are being transmitted with a view to limiting the amount of control signalling transmitted on the network.

As previously mentioned, the relay selection may be triggered by a potential relay node itself. For example, if a mobile node continuously receives discovery and communication messages from different UEs, and with a relatively good quality, it could assume that it is positioned in a central location for a local network (e.g. group of UEs). It can then report such event to the network if in coverage, or the one or more of the UEs in the local network. To report to the network its desire to be a relay, any suitable type of signalling can be used, for example dedicated signalling. In some cases, the mobile node will report on this when it receives an indication that the link quality between two or more of the request terminals is relatively low (e.g. below a threshold) with a view to limiting the amount of signalling from this mobile node. Also, in some examples the mobile node may count the number of successfully decoded D2D communication messages which are from different UEs, within a predefined time window and the mobile node may then report to the appropriate elements (e.g. mobile node, terminal(s), etc.) only if this number exceeds a predefined limit.

Also a previously mentioned, the network can decide to trigger the relay identification. For example, if the network identifies a concentrated D2D traffic area (for example if the network has access to positioning information for the terminals) with potentially some low quality links between some of the terminals, it may then trigger the search for a terminal-to-terminal relay for this area, with a view to improving the D2D communications in this area.

Once the search for a terminal-to-terminal relay node has been activated, one or more selection criteria may be used to try to identify a suitable relay. In some examples, all terminals and potentially other mobile nodes could potentially assist with terminal-to-terminal communications, unless it designated not to operate as such. Whether a mobile node can operate and/or wishes to operate as a relay could thus for example be indicated in the capability information for the mobile node.

Also, in a specific situation, link quality measurements can becomes relevant to which mobile node may be considered as more suitable than another to operate as a terminal-to-terminal relay node. For example a mobile node with a good quality Uu link with the network (if in-coverage) as well as good PC5 links with the requested UEs is more likely to be selected as the relay node than a mobile node with a lower link quality one these links. For instance, considering two request terminals UE1 and UE2, the mobile node which has better link quality with both UE1 and UE2, as well as good link quality with the network, will be more likely to become the relay node of UE1 and UE2 if one is required or requested.

In an example where broadcast is considered, a candidate relay would preferable be a mobile node located as close as possible to a central location with respect to the request terminals. For example the mobile node may be selected based on an averaged link quality with request terminals (e.g. using a linear average). In some examples, the link quality may be considered separately for the request terminal transmitting the broadcast communication and the request terminal(s) receiving the broadcast communication. In the case of a broadcast communication, some receiving terminals may have relatively poor quality links with the sender. Once a measurement report has been received that indicates the relatively low quality to receive the broadcast communication, a relay may be selected to assist these terminals only. The relay can for example work as an intermediate node between the broadcast sender and a group of UEs which is a subset of all UEs receiving the broadcast transmissions. Such a relay can sometimes be referred to as terminal-to-terminal groupcast relay. As groupcast can be considered as a broadcast (to a subset of all receiver UEs), the above discussion in respect of selection criteria or criterion for broadcast can apply equally to the selection of a groupcast terminal-to-terminal relay.

Figure 11:
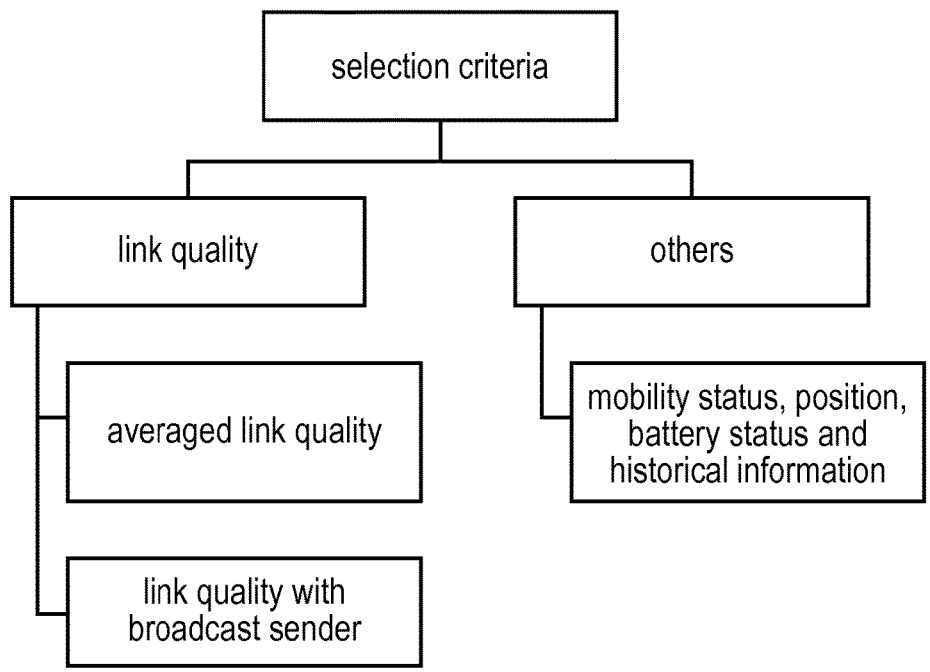
FIG. 11 represents possible relay selection criteria.

Additional or alternative information may assist the relay selection, for example mobility status, position, battery status and/or historical information could be taken into consideration if appropriate. By way of summary, FIG. 11 illustrates possible selection criteria that may be used individually or in combination for selecting a relay node.

Figure 12:
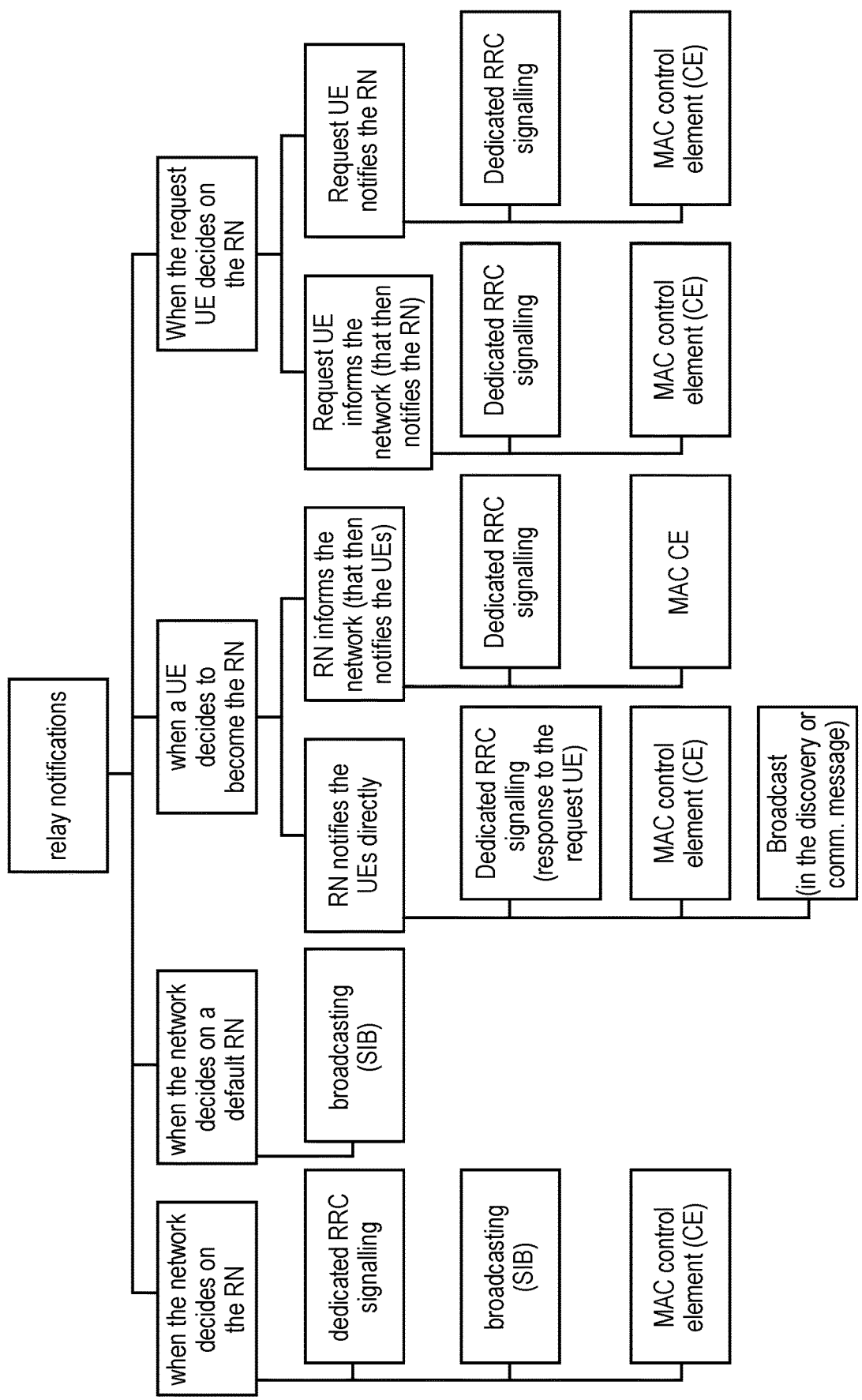
FIG. 12 represents example of possible relay notification types.

Once the D2D relay node has been selected or identified, the selection can be notified to the relevant mobile nodes. The notification procedure can thus depend on the node that made the selection for the relay node. FIG. 12 illustrates different possible notification types that can be used in accordance with the present disclosure, depending on which node made the decision regarding the relay node selection, as discussed at least in part below.

If the decision was made by the network, the network can notify the relay node and the transmitting request terminal of the decision, and optionally the receiving request terminals as well. In one example, the network can use dedicated RRC signalling to the selected relay node and to the transmitting request UE to indicate the selection and that the selected relay node will now assist the transmitting terminal. In the signalling to relay, the notification may contain one or more of a carrier or cell index to be used for carrying out the relaying, the serving source UE (transmitting request UE), the serving destination UE or UE groups, service type (broadcast, unicast), and any other appropriate information. In the signalling to transmitting request UE, the notification may contain one or more of a carrier or cell index for carrying out the relaying, a relay node identifier (e.g. a ProSe UE ID), destination UE or UE groups, service type (broadcast, unicast), and any other appropriate information.

This notification can be sent directly to the relevant mobile nodes and/or may be broadcast to all terminals. Alternatively, the network can broadcast the relaying information. For example, the broadcasted notification may include one or more of a carrier or cell index to be used for carrying out the relaying, a relay node identifier (e.g. a ProSe UE ID), the serving source UE (transmitting request UE), the serving destination UE or UE groups, service type (broadcast, unicast), and any other appropriate information. In one example, the network can also indicate a condition for the identified relay node to be activated as the relay: the relay is in this case identified as the designated relay node, should the quality of the D2D communication decrease. For example the notification can then further include one or more conditions to activate the relay such as a Uu link quality threshold or an averaged PC5 link quality threshold. The broadcasted relaying information may for example be communicated by the network in the System Information (SI) transmissions. The request terminals can then be informed of the relay node and forward its messages to the relay either as soon as it has been notified or once one or more of the conditions, if any have been set, have been met. Accordingly, the network can notify the other mobile nodes of a relay node to be used now or to be considered as a default relay to be potentially activated later.

In one example, the network could send the notification to a specific destination (e.g. relay node) for example using a MAC-CE. Table 2 below illustrates a format for a MAC-CE, with pre-defined LCID, for notifying the relay node.

TABLE 2

| C7 | C6 | C5 | C4 | C3 | C2 | C1 | C0 |
|----|----|----|----|----|----|----|----|
| B/U | R | R | R | R | R | R | R |
| Destination UE(group) ID | | | | | | | |
| Destination UE (group) ID | | | | | | | |
| Destination UE (group) ID | | | | | | | |
| Source UE ID | | | | | | | |
| Source UE ID | | | | | | | |
| Source UE ID | | | | | | | |

In this example, Ci is for indicating the Scell(s) to be activated for the relay, with C0 referring to the serving cell. The network could select a different carrier to carry out the UE relaying. As previously, in this example the B/U field refers to a broadcast or unicast indicator.

Likewise, a notification can be sent to the request UE, for example in the form of a MAC-CE with a format as shown in Table 3 below.

TABLE 3

| C7 | C6 | C5 | C4 | C3 | C2 | C1 | C0 |
|----|----|----|----|----|----|----|----|
| B/U | R | R | R | R | R | R | R |
| Relay UE (ProSe UE) ID | | | | | | | |
| Relay UE (ProSe UE) ID | | | | | | | |
| Relay UE (ProSe UE) ID | | | | | | | |
| Destination UE (group) ID | | | | | | | |

TABLE 3-continued

| C7 | C6 | C5 | C4 | C3 | C2 | C1 | C0 |
|----|----|----|----|----|----|----|----|
| B/U | R | R | R | R | R | R | R |
| Destination UE (group) ID | | | | | | | |
| Destination UE (group) ID | | | | | | | |

In this example, Ci is also for indicating the Scell(s) to be activated for the relay, with C0 referring to the serving cell and, as previously, the B/U field refers to a broadcast or unicast indicator.

If the decision is made by the relay node itself, for example in response to a relay request from a request terminal, it can notify the request terminal directly. For example, it can use a MAC CE in for example a MAC PDU (on a shared transport channel such as SL-SCH). A possible format for the MAC-CE is shown in table 4 below, where a pre-defined LCID can be used. Alternatively or additionally, dedicated signalling may also be used.

TABLE 4

| C7 | C6 | C5 | C4 | C3 | C2 | C1 | C0 |
|----|----|----|----|----|----|----|----|
| B/U | R | R | R | R | R | R | R |
| Destination UE(group) ID | | | | | | | |
| Destination UE(group) ID | | | | | | | |
| Destination UE(group) ID | | | | | | | |

Alternatively or additionally, the relay node may broadcast the notification in a discovery or communication message. This broadcast notification method may be particularly usefully when the relay is to operate as the default relay node for an area, as all terminals within the area can be notified of this.

The relay node could alternatively or additionally send a notification to the network. This notification can for example be sent via dedicated signalling or MAC CE which may contain one or more of a. preferred Scell for relaying, service type (broadcast or unicast), destination UE (or group), request UE (e.g. ProSE id) and any other suitable information, as shown in Table 5 below.

TABLE 5

| C7 | C6 | C5 | C4 | C3 | C2 | C1 | C0 |
|----|----|----|----|----|----|----|----|
| B/U | R | R | R | R | R | R | R |
| Destination UE (group) ID | | | | | | | |
| Destination UE (group) ID | | | | | | | |
| Destination UE (group) ID | | | | | | | |
| Request UE (ProSe UE) ID | | | | | | | |
| Request UE (ProSe UE) ID | | | | | | | |
| Request UE (ProSe UE) ID | | | | | | | |

The relay node can then relay on the network for sending the appropriate relaying information to a broader area and to relevant terminals.

If the selection has been made by a request UE, the request UE may have for example received one or more relay offer notifications, for example in a format as illustrated or similar to that illustrated in Table 4. The request UE may then have decided on a suitable relay node based on these relay offer notifications. Once the request terminal has decided on a relay node, it can send a message to the network, by dedicated signalling or in a MAC-CE message, indicating for example one or more of a preferred Scell for the relaying, a service type (broadcast or unicast), destination UE (or group), a relay node ID (for example a UE ProSE ID), and any other suitable information. An example format for a MAC-CE message is illustrated in Table 6 below.

TABLE 6

| C7  | C6 | C5 | C4 | C3 | C2 | C1 | C0 |
|-----|----|----|----|----|----|----|----|
| B/U | R  | R  | R  | R  | R  | R  | R  |
| Destination UE (group) ID ||||||||
| Destination UE (group) ID ||||||||
| Destination UE (group) ID ||||||||
| Relay UE (ProSe UE) ID ||||||||
| Relay UE (ProSe UE) ID ||||||||
| Relay UE (ProSe UE) ID ||||||||

After receiving the message, the network can notify the relay node, for example with a message as illustrated in Table 2. In some examples, the request UE could respond directly to the selected relay node. The notification response could for example use dedicated signalling or existing signalling formats, such as a MAC-CE in for example MAC PDU (on a shared transport channel such as SL-SCH), with pre-defined LCID. An example of a MAC-CE format is shown below in Table 7 for illustrative purposes.

TABLE 7

| C7  | C6 | C5 | C4 | C3 | C2 | C1 | C0 |
|-----|----|----|----|----|----|----|----|
| B/U | R  | R  | R  | R  | R  | R  | R  |
| Relay UE (ProSe UE) ID ||||||||
| Relay UE (ProSe UE) ID ||||||||
| Relay UE (ProSe UE) ID ||||||||
| Destination UE(group) ID ||||||||
| Destination UE(group) ID ||||||||
| Destination UE(group) ID ||||||||

Accordingly, the decision on which relay node has been selected for immediate activation or for later conditional activation can be communicated to the relevant terminals and/or mobile nodes. As the skilled person wold have understood from the above discussion, the notification may be made either directly or indirectly to the relevant party, for example by sending a message that the party will receive directly (e.g. via a unicast or broadcast message) or by sending a message to an intermediate party (e.g. a base station) that can forward notification information to the relevant parties.

Figure 13:
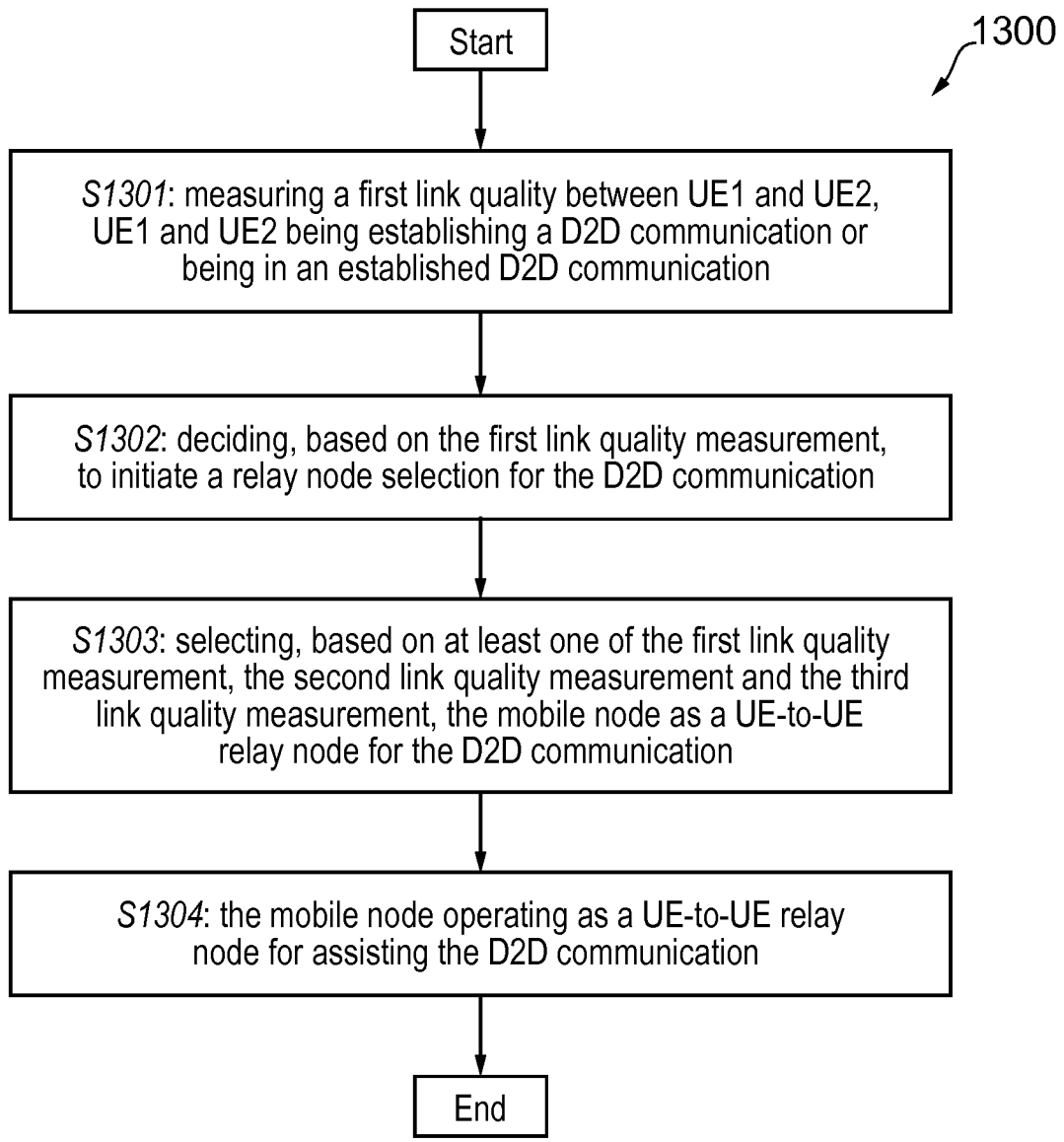
FIG. 13 provides an illustration of another example method for selecting a terminal-to-terminal relay.

FIG. 13 illustrates an example method for identifying a terminal-to-terminal relay node in accordance with an example of the present disclosure. In this example, only two request terminals are being considered but the same teachings apply if more than two terminals UE1 and UE2 are being considered (e.g. in a D2D multicast or broadcast communication). The method 1300 starts and at S1301 a first link quality between UE1 and UE2 is measured, where UE1 and UE2 are establishing a D2D communication or are in an already established D2D communication. Then, at 1302 it can be decided to initiate a relay node selection for the D2D communication. This could for example result from a first link quality measurement indicating a poor link quality for the D2D communication with direct transmissions between the two terminals, of from any other suitable trigger (e.g. based on other measurements and/or a dense D2D traffic area as discussed above). At 1303: the mobile node can be selected as a UE-to-UE relay node for the D2D communication. This can for example be based on one or more of the first link quality measurement, other link quality measurements, other measurements and a D2D communication type (e.g. unicast, multicast or broadcast), and any other suitable parameter. From one perspective, steps S1302 and S1304 (and any additional step or sub-steps that may be carried out) may be viewed as a single step for identifying a mobile node as a suitable relay node, wherein the identifying (so in the specific example of FIG. 13, at least one of S1302 and S1303) is based on the first link quality measurement. As previously indicated, by using this different type of measurement, the relaying scheme may be optimised by optimising at least one of the triggering of a relay search (i.e. identifying that relaying would assist the transmissions) and the selection of the relay. Then at S1304, the selected mobile node can operate as a terminal-to-terminal relay node for assisting the D2D communication which may also involve at least one of UE1 and UE2 transmitting its D2D signals for the D2D communication to the relay node. In some examples, this can be preceded by the transmission of one or more notification messages to at least one of UE1, UE2, the mobile and the base station (if possible at all).

Therefore, in accordance with the present disclosure, there is provided an arrangement in which the D2D communications can be assisted using terminal-to-terminal relaying between a first D2D terminal and one or more other D2D terminals. It is expected that such relaying assistance will help improving D2D performance. Relevant trigger events as well as relay selection criteria can be defined, wherein at least one of these are based on one or more measurements between a first D2D terminal (e.g. a transmitting D2D UE) and one or more other D2D terminals (e.g. receiving D2D terminals(s)). Accordingly, the present disclosure has been provided with a view to provide a more efficient and dynamic network topology using the proposed measurement report trigger, selection criteria and notification scheme as appropriate. It is noteworthy that while existing LTE Rel'12 and Rel'13 standard outlines some relaying solutions, these have been designed to address public safety communications (ProSe) which are mainly UE-to-Network relay oriented, such that they can be unhelpful when considering the different situation of terminal-to-terminal relaying, in particular for both or either unicast or broadcast D2D communications.

It is also noteworthy that, in accordance with the present disclosure, the selection of a relay node may be based on the type of D2D communication, for example one of unicast, multicast or broadcast or, for current D2D standards proposed by the 3GPP consortium, one of unicast or broadcast. In these examples, this could for example affect the selection criterion or criteria used for identifying the relay node. In one example, for a unicast D2D communication, the selection of the relay node may only be based on the PC5 link between the two request UEs, the PC5 links between the potential relay and each of the two UEs while, for a broadcast (or groupcast) communication, the location of the potential relay node with respect to the relevant group of terminals may be used instead. Accordingly, the request for a relay and/or the notification messages may include an indication of the type of D2D communication to be relayed or that will be relayed, respectively.

In the examples above where information has to be sent from a terminal to another mobile node (e.g. a relay node or a base station), the terminal may not always be already in a connected state and might have to change to a connected mode to send the information, and the terminal may then change back to a non-connected state. For example, in a case where a neighbouring terminal (regardless of it being a request terminal or not) wishes to send a measurement report to a base station, a terminal or a relay node, in a 3GPP environment using an RRC protocol, the neighbouring terminal may not be in a RRC_CONNECTED state. In this case, the terminal may transition to a RRC_CONNECTED state, for example following the network (e.g. the base station) sending RRC connection establishment signalling, so that the terminal can send the measurement report. The terminal may then transition back to the RRC_IDLE state, if appropriate.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. For example, in the method of FIG. 13, any of steps S1302-S1304 may be carried out in parallel to step S1301. For example, the selection and/or notification of a relay node selection may be performed while the link quality of one or more sidelink is being measured (and optionally reported as well). So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more or a mobile terminal (e.g. a D2D terminal), a relay node (e.g. a terminal-to-terminal relay node), a base station or any other mobile node may be configured accordingly if appropriate, so long as it is technically feasible.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of relaying a terminal-to-terminal communication in a mobile telecommunication system, the mobile communication system comprising a first mobile terminal, a second mobile terminal and a mobile node configured to operate as a terminal-to-terminal relay node, the method comprising:
measuring a first link quality between the first mobile terminal and the second mobile terminal wherein the first mobile terminal and the second mobile terminal are establishing a, or are in an established, device-to-device communication;
identifying, based on at least the measured first link quality, that the mobile node is a suitable candidate for operating as a terminal-to-terminal relay node for the device-to-device communication; and
the mobile node operating as a terminal-to-terminal relay node for assisting the device-to-device communication.

Clause 2. The method of clause 1, wherein the identifying is further based on the device-to-device communication being one of a unicast communication, a multicast communication or a broadcast communication.

Clause 3. The method of clause 2 wherein the identifying comprising sending a relay request for selecting a terminal-to-terminal relay node for the device-to-device communication, wherein the relay request comprises an indication of the device-to-device communication being one of a unicast communication, a multicast communication or a broadcast communication.

Clause 4. The method of any preceding clause wherein the identifying comprises sending a relay request for selecting a terminal-to-terminal relay node for the device-to-device communication.

Clause 5. The method of any preceding clause wherein the identifying comprises:
measuring at least one of a second link quality between the first mobile terminal and the mobile node and measuring a third link quality between the second terminal and the mobile node;
wherein the identifying step is further based on the at least one of the measured second link quality and the measured third link quality.

Clause 6. The method of clause 5, further comprising transmitting a radio resource control connection setup message to one of the first mobile terminal, the second mobile terminal and the mobile node for transitioning the one of the first mobile terminal, the second mobile terminal and the mobile node to a radio resource control connected state;
once in the radio resource control connected state, the one of the first mobile terminal, the second mobile terminal and the mobile node transmitting a measurement report based on the at least one of the measured second link quality and the measured third link quality.

Clause 7. The method of any preceding clause wherein the identifying comprises:

deciding to initiate a relay node selection for the device-to-device communication; and selecting the mobile node as a terminal-to-terminal relay node for the device-to-device communication;

wherein at least one of the deciding and selecting step is based on the measured first link quality.

Clause 8. The method of clause 7 wherein the identifying comprises:

measuring at least one of a second link quality between the first mobile terminal and the mobile node and measuring a third link quality between the second terminal and the mobile node;

wherein the least one of the deciding and selecting step is further based on the at least one of the measured second link quality and the measured third link quality.

Clause 9. The method of clause 7 or 8 wherein the deciding to initiate a relay node selection is by one of: the first mobile terminal, the second mobile terminal, the mobile node.

Clause 10. The method of any one of clauses 7 to 9, wherein the mobile telecommunication system comprises a base station operable to communicate with the first mobile terminal, the second mobile terminal and the mobile node and wherein said base station carries out one or more of the deciding to initiate a relay node selection and the selecting of the mobile node as a terminal-to-terminal relay node Clause 11. The method of any preceding clause, wherein the identifying is further based on the device-to-device communication being one of a unicast or a broadcast communication.

Clause 12. The method of any preceding clause, further comprising notifying at least one of the first mobile terminal, the second terminal and the mobile node of the identification of the mobile node as a terminal-to-terminal relay node for the device-to-device communication.

Clause 13. The method of clause 12, wherein the notifying is via one of: broadcasted signalling, RRC signalling or MAC signalling.

Clause 14. The method of any preceding clause, wherein the identifying comprises detecting that an event has occurred, the event being triggered by a pre-configured condition defined based on a specific link quality measurement.

Clause 15. The method of clause 14, further comprising, upon detection that the event has occurred, transmitting a measurement report based on the specific link quality measurement.

Clause 16. The method of clause 15, wherein the measurement report comprises an indication that the device-to-device communication is one of a unicast and a broadcast communication.

Clause 17. The method of clause 15 or 16, wherein transmitting the measurement report comprises:

one of the first mobile terminal, the second mobile terminal and the mobile node selecting the best N link qualities from a set of all the link qualities measured by the one of the first mobile terminal, the second mobile terminal and the mobile node, with N≥1; and the one of the first mobile terminal, the second mobile terminal and the mobile node transmitting the measurement report indicating the selected best N link quality.

Clause 18. The method of any preceding clause wherein the mobile node is a mobile terminal.

Clause 19. A method of operating a first mobile terminal in a mobile telecommunication system, the mobile communication system comprising the first mobile terminal, a second mobile terminal and a mobile node configured to operate as a terminal-to-terminal relay node, the method comprising the first mobile terminal:

measuring a first link quality between the first mobile terminal and the second terminal wherein the first mobile terminal and the second mobile terminal are establishing a, or are in an established, device-to-device communication;

identifying, based on at least the measured first link quality, that the mobile node is a suitable candidate for operating as a terminal-to-terminal relay node for the device-to-device communication; and communicating with the second mobile terminal using the mobile node as a terminal-to-terminal relay.

Clause 20. A mobile terminal for use in a mobile telecommunication system, the mobile communication system comprising the mobile terminal, a second mobile terminal and a mobile node configured to operate as a terminal-to-terminal relay node, the mobile terminal being configured to:

measure a first link quality between the mobile terminal and the second terminal wherein the mobile terminal and the second mobile terminal are establishing a, or are in an established, device-to-device communication;

identify, based on at least the measured first link quality, that the mobile node is a suitable candidate for operating as a terminal-to-terminal relay node for the device-to-device communication; and communicate with the second mobile terminal using the mobile node as a terminal-to-terminal relay.

Clause 21. Circuitry for a mobile terminal for use in a mobile telecommunications system comprising the mobile terminal, a second mobile terminal and a mobile node configured to operate as a terminal-to-terminal relay node, wherein the circuitry comprises a controller element and a transceiver element configured to operate together to:

measure a first link quality between the mobile terminal and the second terminal wherein the mobile terminal and the second mobile terminal are establishing a, or are in an established, device-to-device communication;

identify, based on at least the measured first link quality, that the mobile node is a suitable candidate for operating as a terminal-to-terminal relay node for the device-to-device communication; and communicate with the second mobile terminal using the mobile node as a terminal-to-terminal relay.

Clause 22. A method of operating a mobile node for relaying a terminal-to-terminal communication in a mobile telecommunication system, the mobile communication system comprising a first mobile terminal, a second mobile terminal and the mobile node, the mobile node being operable as a terminal-to-terminal relay node, wherein the method comprises the mobile node:

based on at least a measured first link quality, the first link quality being measured between the first mobile terminal and the second terminal wherein the first mobile terminal and the second mobile terminal are establishing a, or are in an established, device-to-device communication, identifying that the mobile node is a suitable candidate for operating as a terminal-to-terminal relay node for the device-to-device communication; and operating as a terminal-to-terminal relay node for assisting the device-to-device communication.

Clause 23. A mobile node for relaying a terminal-to-terminal communication in a mobile telecommunication system, the mobile communication system comprising a first mobile terminal, a second mobile terminal and the mobile node, the mobile node being operable as a terminal-to-terminal relay node and being configured to:
based on at least a measured first link quality, the first link quality being measured between the first mobile terminal and the second terminal wherein the first mobile terminal and the second mobile terminal are establishing a, or are in an established, device-to-device communication, identify that the mobile node is a suitable candidate for operating as a terminal-to-terminal relay node for the device-to-device communication; and
operate as a terminal-to-terminal relay node for assisting the device-to-device communication.

Clause 24. Circuitry for a mobile node for relaying a terminal-to-terminal communication in a mobile telecommunication system, the mobile communication system comprising a first mobile terminal, a second mobile terminal and the mobile node, wherein the circuitry comprises a controller element and a transceiver element configured to operate together to:
based on at least a measured first link quality, the first link quality being measured between the first mobile terminal and the second terminal wherein the first mobile terminal and the second mobile terminal are establishing a, or are in an established, device-to-device communication, identify that the mobile node is a suitable candidate for operating as a terminal-to-terminal relay node for the device-to-device communication; and
operate as a terminal-to-terminal relay node for assisting the device-to-device communication.

Clause 25. A method of operating a base station for relaying a terminal-to-terminal communication in a mobile telecommunication system, the mobile communication system comprising a first mobile terminal, a second mobile terminal and a mobile node configured to operate as a terminal-to-terminal relay node, the method comprising the base station:
receiving a measurement report relating to a first link quality between the first mobile terminal and the second terminal wherein the first mobile terminal and the second mobile terminal are establishing a, or are in an established, device-to-device communication;
identifying, based on at least the measured first link quality, that the mobile node is a suitable candidate for operating as a terminal-to-terminal relay node for the device-to-device communication; and
instructing the mobile node and at least one of the first and second mobile terminals to use the mobile node as a terminal-to-terminal relay node for assisting the device-to-device communication.

Clause 26. A base station for relaying a terminal-to-terminal communication in a mobile telecommunication system, the mobile communication system comprising a first mobile terminal, a second mobile terminal and a mobile node configured to operate as a terminal-to-terminal relay node, the station being configured to:
receive a measurement report relating to a first link quality between the first mobile terminal and the second terminal wherein the first mobile terminal and the second mobile terminal are establishing a, or are in an established, device-to-device communication;
identify, based on at least the measured first link quality, that the mobile node is a suitable candidate for operating as a terminal-to-terminal relay node for the device-to-device communication; and
instruct the mobile node and at least one of the first and second mobile terminals to use the mobile node as a terminal-to-terminal relay node for assisting the device-to-device communication.

Clause 27. Circuitry for a base station for relaying a terminal-to-terminal communication in a mobile telecommunication system, the mobile communication system comprising a first mobile terminal, a second mobile terminal and a mobile node configured to operate as a terminal-to-terminal relay node, wherein the circuitry comprises a controller element and a transceiver element configured to operate together to:
receive a measurement report relating to a first link quality between the first mobile terminal and the second terminal wherein the first mobile terminal and the second mobile terminal are establishing a, or are in an established, device-to-device communication;
identify, based on at least the measured first link quality, that the mobile node is a suitable candidate for operating as a terminal-to-terminal relay node for the device-to-device communication; and
instruct the mobile node and at least one of the first and second mobile terminals to use the mobile node as a terminal-to-terminal relay node for assisting the device-to-device communication.

Clause 28. Computer software which, when executed by a computer, causes the computer to perform the method of any one of clauses 1 to 18, 19, 22 and 25.

Clause 29. A storage medium which stores computer software according to clause 28.

Clause 30. A method of relaying a terminal-to-terminal communication, a method of operating a first mobile terminal, a mobile terminal, circuitry for a mobile terminal, a method of operating a mobile node, a mobile node, circuitry for a mobile node, a method of operating a base station, a base station for relaying a terminal-to-terminal communication, circuitry for a base station for relaying a terminal-to-terminal communication, computer software and/or a storage medium substantially as hereinbefore described with reference to the accompanying drawings.

Clause 30. Any preceding clause wherein the mobile terminals and the mobile node (and the base station if appropriate) are operable to communicate via the wireless interface using at least one of: a 3GPP communication protocol, an LTE communication protocol, a 4G communication protocol and a 5G communication protocol.

REFERENCES

[1] Holma H. and Toskala A., "LTE for UMTS OFDMA and SC-FDMA based radio access", John Wiley and Sons, 2009

The invention claimed is:
1. A method of relaying a terminal-to-terminal communication in a mobile telecommunication system, the mobile communication system comprising a first mobile terminal, a second mobile terminal and a mobile node, the method comprising:
measuring a first link quality of a direct link between the first mobile terminal and the second mobile terminal for device-to-device communication directly between the first mobile terminal and the second mobile terminal;
identifying, based on at least the measured first link quality, that the mobile node is a suitable candidate for operating as a terminal-to-terminal relay node for assisting the device-to-device communication; and controlling the mobile node to operate as the terminal-to-terminal relay node to assist the device-to-device communication.

2. The method of claim 1, wherein the identifying is further based on the device-to-device communication being one of a unicast communication, a multicast communication or a broadcast communication.

3. The method of claim 2, wherein
the identifying comprising sending a relay request for selecting the terminal-to-terminal relay node for the device-to-device communication, and
the relay request comprising an indication of the device-to-device communication being one of the unicast communication, the multicast communication or the broadcast communication.

4. The method of claim 1, wherein the identifying comprises sending a relay request for selecting a terminal-to-terminal relay node for the device-to-device communication.

5. The method of claim 1, wherein
the identifying comprises measuring at least one of a second link quality between the first mobile terminal and the mobile node and measuring a third link quality between the second terminal and the mobile node, and
the identifying is based on the at least one of the measured second link quality and the measured third link quality.

6. The method of claim 5, further comprising:
transmitting a radio resource control connection setup message to one of the first mobile terminal, the second mobile terminal and the mobile node for transitioning the one of the first mobile terminal, the second mobile terminal and the mobile node to a radio resource control connected state; and
once in the radio resource control connected state; the one of the first mobile terminal, the second mobile terminal and the mobile node transmitting a measurement report based on the at least one of the measured second link quality and the measured third link quality.

7. The method of claim 1 wherein
the identifying comprises:
deciding to initiate a relay node selection for the device-to-device communication; and
selecting the mobile node as a terminal-to-terminal relay node for the device-to-device communication, and
at least one of the deciding and the selecting is based on the measured first link quality.

8. The method of claim 7 wherein
the identifying comprises:
measuring at least one of a second link quality between the first mobile terminal and the mobile node; and
measuring a third link quality between the second terminal and the mobile node, and
the least one of the deciding and the selecting is further based on the at least one of the measured second link quality and the measured third link quality.

9. The method of claim 7, wherein the deciding to initiate a relay node selection is by one of:
the first mobile terminal,
the second mobile terminal, and
the mobile node.

10. The method of claim 7, wherein
the mobile telecommunication system comprises a base station operable to communicate with the first mobile terminal, the second mobile terminal and the mobile node, and
said base station carries out one or more of the deciding to initiate a relay node selection and the selecting of the mobile node as a terminal-to-terminal relay node.

11. The method of claim 1, wherein the identifying is further based on the device-to-device communication being one of a unicast or a broadcast communication.

12. The method of claim 1, further comprising notifying at least one of the first mobile terminal, the second terminal and the mobile node of the identification of the node as a terminal-to-terminal relay node for the device-to-device communication.

13. The method of claim 12, wherein the notifying is via one of: broadcasted signaling, RRC signalling or MAC signalling.

14. The method of claim 1, wherein the identifying comprises detecting that an event has occurred, the event being triggered by a pre-configured condition defined based on a specific link quality measurement.

15. The method of claim 14, further comprising transmitting, upon detection that the event has occurred, a measurement report based on the specific link quality measurement.

16. The method of claim 15, wherein the measurement report comprises an indication that the device-to-device communication is one of a unicast and a broadcast communication.

17. The method of claim 15, wherein the transmitting comprises:
one of the first mobile terminal, the second mobile terminal and the mobile node selecting the best N link qualities from a set of all the link qualities measured by the one of the first mobile terminal, the second mobile terminal and the mobile node, with $N \geq 1$; and
the one of the first mobile terminal, the second mobile terminal and the mobile node transmitting the measurement report indicating the selected best N link quality.

18. The method of claim 1, wherein the mobile node is a mobile terminal.

19. A mobile terminal for use in a mobile telecommunication system, the mobile communication system comprising the mobile terminal, a second mobile terminal and a mobile node, the mobile terminal being configured to:
measure a first link quality of a direct link between the mobile terminal and the second terminal for device-to-device communication directly between the mobile terminal and the second mobile terminal;
identify, based on at least the measured first link quality, that the mobile node is a suitable candidate for operating as a terminal-to-terminal relay node for assisting the device-to-device communication; and
communicate with the second mobile terminal using the mobile node as a terminal-to-terminal relay.

20. Circuitry for a mobile terminal for use in a mobile telecommunications system comprising the mobile terminal, a second mobile terminal and a mobile node, wherein the circuitry comprises a controller element and a transceiver element configured to operate together to:
measure a first link quality of a direct link between the mobile terminal and the second terminal for device-to-device communication directly between the mobile terminal and the second mobile terminal;
identify, based on at least the measured first link quality, that the mobile node is a suitable candidate for operating as a terminal-to-terminal relay node for assisting the device-to-device communication; and communicate with the second mobile terminal using the mobile node as a terminal-to-terminal relay.

* * * * *